(12) United States Patent
Hirose et al.

(10) Patent No.: US 7,119,735 B2
(45) Date of Patent: Oct. 10, 2006

(54) VEHICLE-INSTALLED RADAR SENSOR SYSTEM AND VEHICLE-INSTALLED RADAR SENSOR

(75) Inventors: Masataka Hirose, Osaka (JP); Jun Fujihara, Kobe (JP)

(73) Assignees: Fujitsu Ten Limited, Kobe (JP); Fujitsu Limited, Kawaskai (JP)

( * ) Notice: Subject to any disclaimer, the term of this patent is extended or adjusted under 35 U.S.C. 154(b) by 0 days.

(21) Appl. No.: 10/857,024

(22) Filed: Jun. 1, 2004

(65) Prior Publication Data

US 2004/0246172 A1 Dec. 9, 2004

(30) Foreign Application Priority Data

Jun. 5, 2003 (JP) ............... 2003-160883

(51) Int. Cl.
*G01S 7/35* (2006.01)
*G01S 13/93* (2006.01)

(52) U.S. Cl. ............... 342/70; 342/27; 342/159; 342/175; 342/198; 343/711; 343/713

(58) Field of Classification Search ............ 342/22, 342/27, 28, 70–72, 175, 21, 159, 195–198; 180/169–171, 271; 343/711–718
See application file for complete search history.

(56) References Cited

U.S. PATENT DOCUMENTS

| 3,683,379 | A | * | 8/1972 | Saddler et al. ............ 342/71 |
| 3,735,398 | A | * | 5/1973 | Ross ............ 180/169 |
| 3,749,197 | A | * | 7/1973 | Deutsch ............ 342/71 |
| 3,750,169 | A | * | 7/1973 | Strenglein ............ 342/72 |
| 3,778,826 | A | * | 12/1973 | Flannery et al. ............ 342/71 |
| 3,794,997 | A | * | 2/1974 | Iwatsuki et al. ............ 342/72 |
| 3,848,914 | A | * | 11/1974 | Wathen ............ 180/271 |
| 3,858,205 | A | * | 12/1974 | Ross ............ 342/72 |
| 3,898,653 | A | * | 8/1975 | Ban et al. ............ 342/70 |
| 3,934,252 | A | * | 1/1976 | Ross et al. ............ 342/72 |
| 4,757,450 | A | * | 7/1988 | Etoh ............ 342/70 |
| 5,373,297 | A | * | 12/1994 | Briguglio ............ 342/159 |
| 5,495,255 | A | * | 2/1996 | Komatsu et al. ............ 342/70 |
| 5,896,104 | A | * | 4/1999 | Komatsu et al. ............ 342/70 |

FOREIGN PATENT DOCUMENTS

| JP | 06-174829 | 6/1994 |
| JP | 2001-201557 | 7/2001 |

* cited by examiner

*Primary Examiner*—Bernarr E. Gregory
(74) *Attorney, Agent, or Firm*—Oliff & Berridge, PLC

(57) ABSTRACT

A vehicle-installed radar sensor system includes a transmission section, a reception section, and a shield member. The transmission section is disposed in a closed space formed between a permeable member provided in a vehicle and a vehicle body, and transmits a radar wave to outside of the vehicle through the permeable member. The reception section is disposed in the closed space at a distance from the transmission section, and receives a reflected wave by a target through the permeable member. The shield member is disposed in at least one of the transmission section and the reception section, and suppresses at least one of occurrence of a reflected wave by the permeable member and reception of the reflected wave by the permeable member.

8 Claims, 11 Drawing Sheets

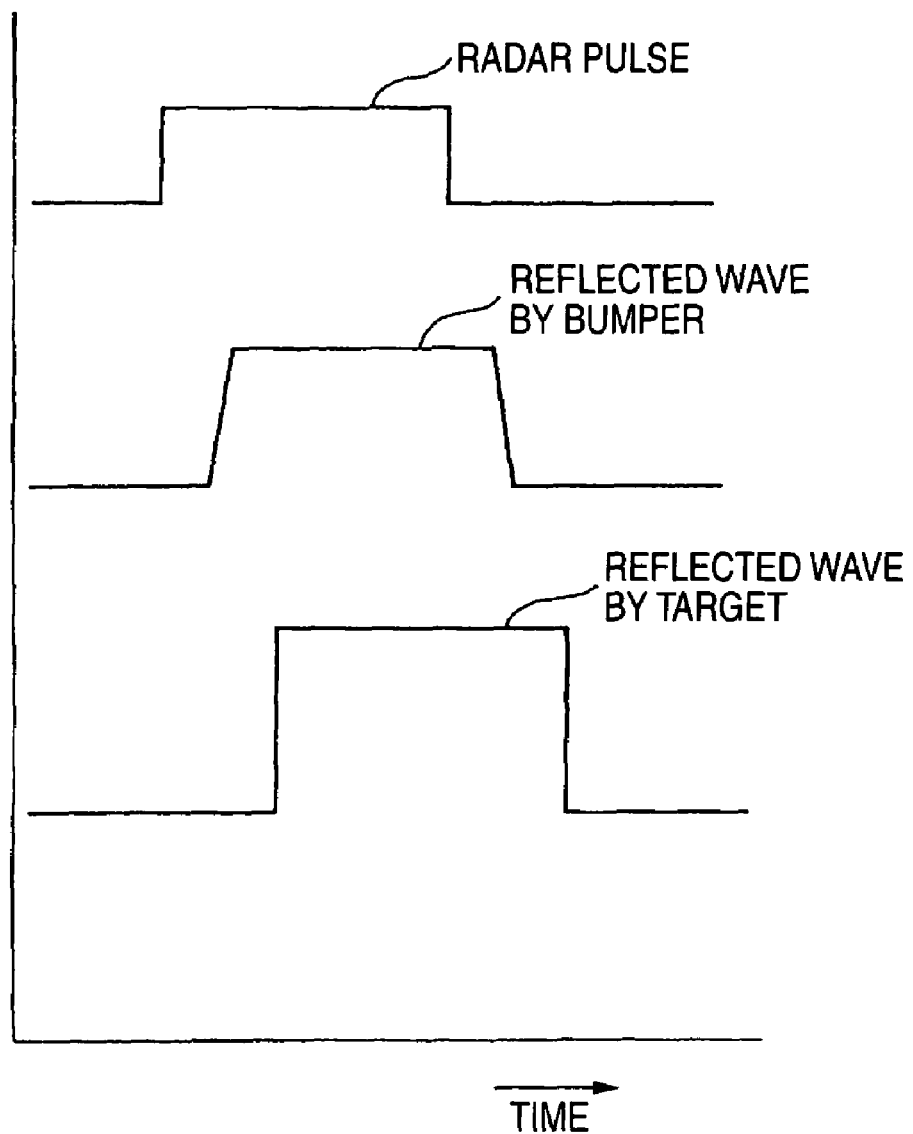

POWER SOURCE

VEHICLE-INSTALLED RADAR SENSOR SYSTEM AND VEHICLE-INSTALLED RADAR SENSOR

BACKGROUND OF THE INVENTION

1. Field of the Invention

This invention relates to a radar sensor system installed in a vehicle and a radar sensor installed in a vehicle and in particular to a vehicle-installed radar sensor system and a vehicle-installed radar sensor in which a transmission section and a reception section are provided separately.

2. Description of the Related Art

A radar sensor using a millimeter wave, a submillimeter wave, etc., is used for monitor ahead of a vehicle for the purpose of preventing a collision of a vehicle and an operation trigger of a person protection function at the vehicle collision time. (For example, refer to JP-A-2001-201557) In a vehicle with a bumper of the vehicle as a permeable member, the radar sensor can also be disposed in a closed space formed between the bumper and the vehicle body from the viewpoint of the design.

To detect a target at a short distance, a transmission section for transmitting a radar wave and a reception section for receiving a reflected wave on the target need to be provided separately. In this case, it is important to prevent the reception section from directly receiving the transmission wave from the transmission section. (For example, refer to JP-A-Hei. 6-174829)

SUMMARY OF THE INVENTION

To install a radar sensor system including a transmission section and a reception section separately in a vehicle, disposing the radar sensor system in the inside of a bumper, namely, the closed space formed between the bumper and the vehicle body is examined as the layout. In this case, a bumper, which is a permeable member, is placed in the front of the radar sensor system.

To adopt this layout, all of radar wave energy does not pass through the permeable member and a part of the radar wave energy is reflected. That is, some reflection occurs in response to the shape of the permeable member, namely, the bumper disposed on the front of the vehicle, and the energy of the reflected wave causes an energy strength distribution to occur in the closed space sandwiched between the permeable member and the vehicle body. If the reception section is disposed at a position where the reflected wave energy by the bumper is strong, stronger energy than the reflected wave energy by a target to be detected by the sensor is sensed, resulting in deterioration of the target detection performance.

The invention was made in view of this problem and the invention provides a vehicle-installed radar sensor system for making it possible to avoid degradation of target detection performance by lessening or excluding the effect of a reflected wave by a permeable member adversely affecting the target detection performance.

To the end, according to a first aspect of the invention, A vehicle-installed radar sensor system includes a transmission section, a reception section, and a shield member. The transmission section is disposed in a closed space formed between a permeable member provided in a vehicle and a vehicle body, and transmits a radar wave to outside of the vehicle through the permeable member. The reception section is disposed in the closed space at a distance from the transmission section, and receives a reflected wave by a target through the permeable member. The shield member is disposed in at least one of the transmission section and the reception section, and suppresses at least one of occurrence of a reflected wave by the permeable member and reception of the reflected wave by the permeable member.

According to a second aspect of the invention, in the system according to the first aspect of the invention, the shield member is formed integrally with the same member as a casing of the at least one of the transmission section and the reception section.

According to a third aspect of the invention, in the system according to the first aspect of the invention, the shield member is disposed on the permeable member side.

To the end, according to a fourth aspect of the invention, a vehicle-installed radar sensor system includes a permeable member, a transmission section, and a reception section. The permeable member is disposed on a front of a vehicle. The transmission section is disposed in a closed space formed between the permeable member and a vehicle body and transmits a radar wave ahead of the vehicle through the permeable member. The reception section is disposed in the closed space at a distance from the transmission section and receives a reflected wave by a target through the permeable member. The permeable member has a shape substantially perpendicular to an antenna directivity at positions corresponding to the transmission section and the reception section.

To the end, according to a fifth aspect of the invention, a vehicle-installed radar sensor system includes a transmission section and a reception section. The transmission section transmits a radar wave ahead of a vehicle. The reception section receives a reflected wave by a target. The transmission section and the reception section are not disposed in a common closed space.

According to a sixth aspect of the invention, in the system according to the fifth aspect of the invention, one of the transmission section and the reception section is disposed in a closed space formed between a permeable member provided on a front of the vehicle and a vehicle body. The other is disposed outside the closed space.

According to a seventh aspect of the invention, in the system according to the fifth aspect of the invention, each of the transmission section and the reception section is integrated with one of a headlamp unit and a fog lamp unit of the vehicle.

To the end, according to an eighth aspect of the invention, there is provided a vehicle installing a vehicle-installed radar sensor system according to any of the first to seventh aspects of the invention.

To the end, according to a ninth aspect of the invention, a vehicle-installed radar sensor includes a transmission section and a shield member. The transmission section is disposed in a closed space formed between a permeable member provided in a vehicle and a vehicle body and transmits a radar wave to outside of the vehicle through the permeable member. The shield member is disposed in the transmission section and suppressing occurrence of a reflected wave by the permeable member.

To the end, according to a tenth aspect of the invention, a vehicle-installed radar sensor includes a transmission section, a reception section, and a shield member. The transmission section is disposed in a closed space formed between a permeable member provided in a vehicle and a vehicle body. The reception section is disposed in the closed space at a distance from the transmission section and receives a reflected wave by a target through the permeable member. The shield member is disposed in the reception section and suppresses reception of a reflected wave by the permeable member.

BRIEF DESCRIPTION OF THE DRAWINGS

FIG. 5 is a time chart to show the relationships among a sent radar pulse, a reflected wave by the bumper, and a reflected wave by a target.

DETAILED DESCRIPTION OF THE PREFERRED EMBODIMENTS

Referring now to the accompanying drawings, embodiments of the invention will be described.

Figure 1:
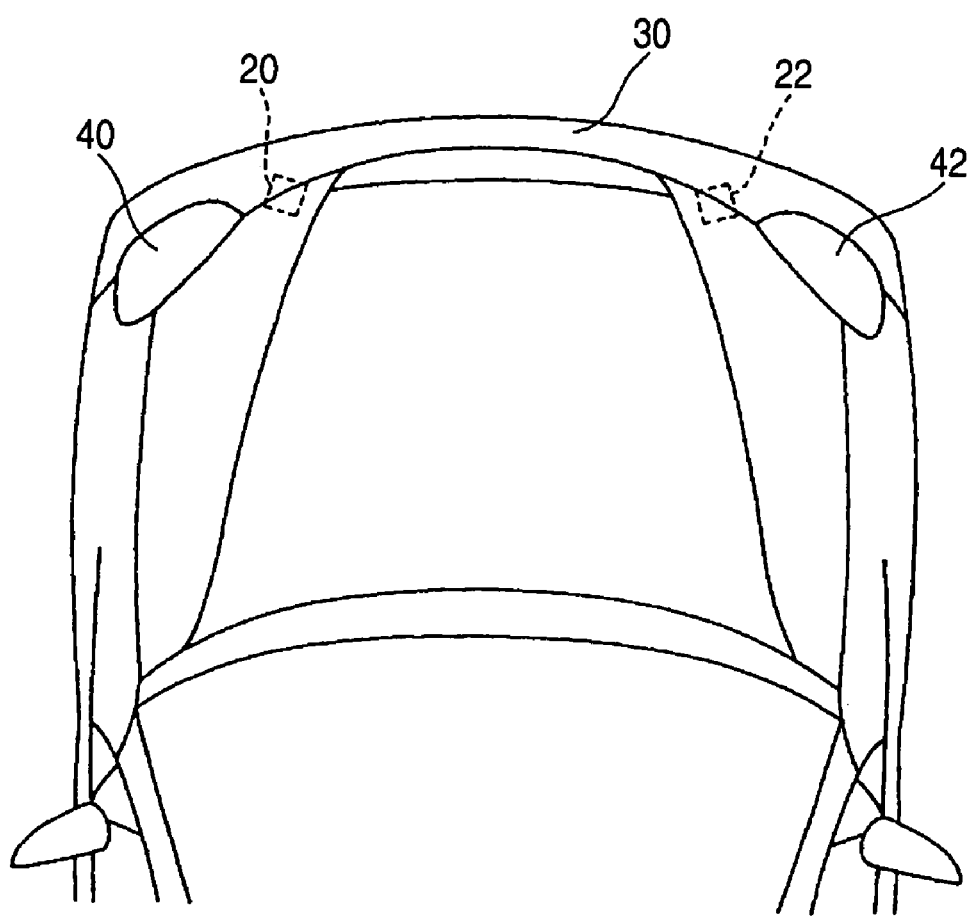
FIG. 1 is a plan view to show the layout of vehicle-installed radar sensor system according to a first embodiment of the invention.
Figure 2:
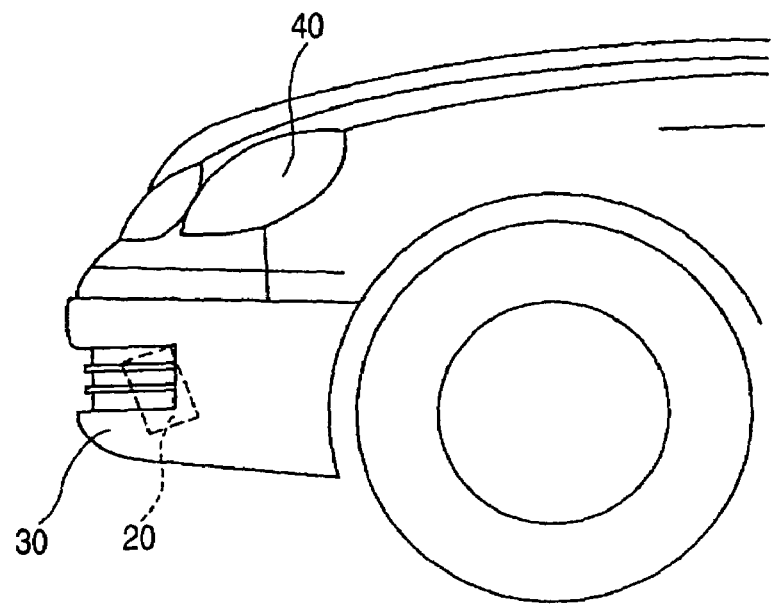
FIG. 2 is a side view to show the layout of vehicle-installed radar sensor system according to the first embodiment of the invention.

FIGS. 1 and 2 are a plan view and a side view to show the layout of a vehicle-installed radar sensor system according to a first embodiment of the invention. The radar sensor system in the embodiment relates to a pulse radar using a radio wave of a millimeter wave or a submillimeter wave, but the invention can also be applied to any other radar sensor system.

The radar sensor system includes a transmission section 20 integral with a transmission antenna and a reception section 22 integral with a reception antenna, and is disposed in the inside of a bumper 30. The bumper 30 is formed of a material for allowing radar wave energy to pass through, namely, is implemented as a permeable member. In this example, the transmission section 20 is disposed at the left of the inside of the bumper 30 and the reception section 22 is disposed at the right of the inside of the bumper 30 when viewed from a driver's seat; but may be vice versa. Numerals 40 and 42 denote headlamp units.

In the system, a radar pulse is transmitted from the transmission section 20 in accordance with the radar wave transmission timing, passes through the bumper 30, and goes ahead of the vehicle. The radar pulse reflected by a target in the cover area arrives at the reception section 22 with a delay of the time responsive to the distance to the target. The delay time is converted into the distance, whereby the position of the target is calculated.

Figure 3:
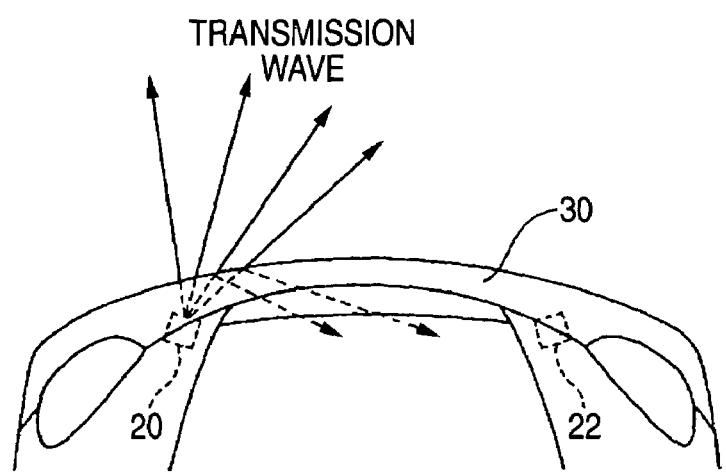
FIG. 3 is a drawing to show how a sent radar wave passes through a bumper or is reflected on the bumper.
Figure 4:
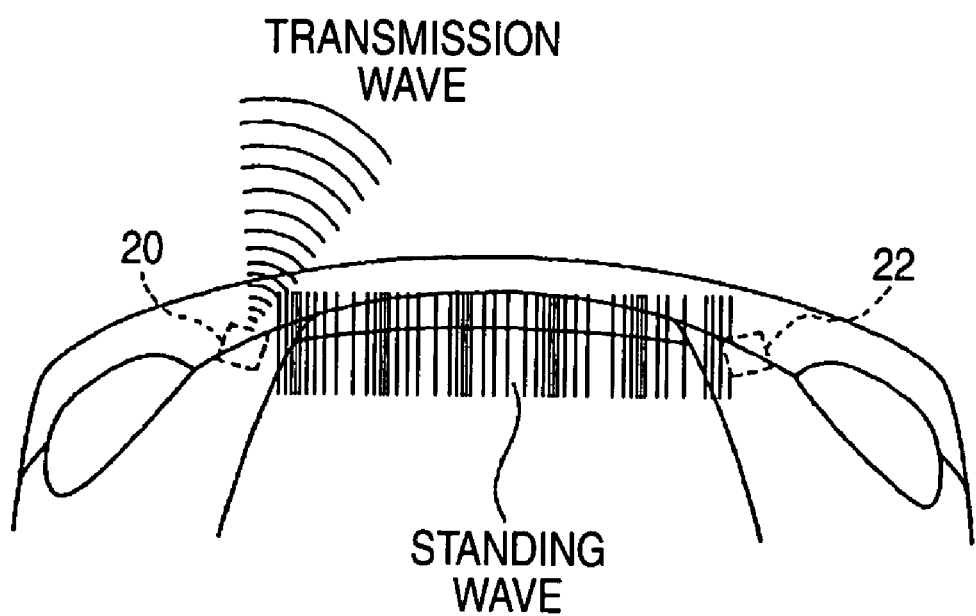
FIG. 4 is a drawing to show a standing wave formed in the closed space between the bumper and the vehicle body.

By the way, the radar wave transmitted from the antenna of the transmission section 20 generally passes through the bumper 30, but not all passes through and a reflected wave by the bumper 30 occurs, as shown in FIG. 3. The energy of this reflected wave forms a standing wave and causes an energy strength distribution to occur in the closed space formed between the bumper and the vehicle body. If the reception section 22 is disposed at a position where the energy is strong, the reflected wave by the bumper 30 arrives at the reception section 22 earlier than the reflected wave by the target to be detected by the sensor system.

FIG. 5 is a time chart to show the relationships among the transmitted radar pulse, the reflected wave by the bumper, and the reflected wave by the target. As shown in the figure, the reflected wave by the bumper arrives at the reception section 22 in the delay time responsive almost to the distance between the transmission section 20 and the reception section 22 after the transmission section 20 transmits the radar pulse. Next, the reflected wave by the target arrives at the reception section 22 in the delay time responsive to the distance to the target. That is, the timing at which the reflection signal from the bumper arrives is earlier than that at which the reflection signal from the target arrives. In such a case, the reflected wave from the target to be essentially detected is masked and the distance between the transmission section 20 and the reception section 22 is calculated.

Figure 6A:
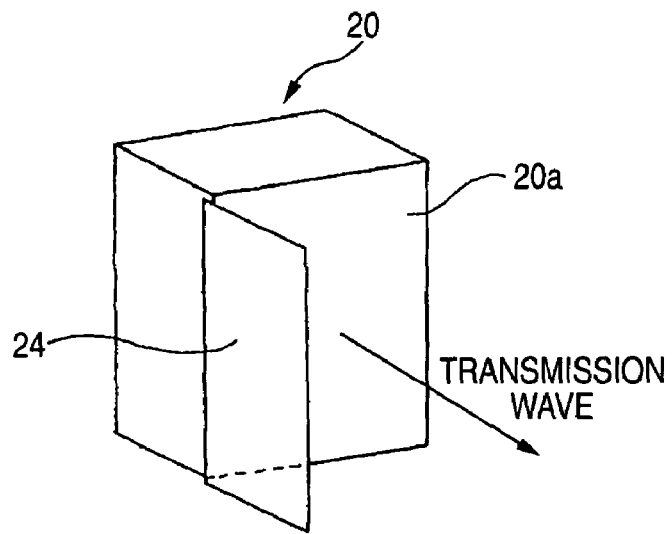
FIGS. 6A and 6B are perspective views to schematically show placement of shield members on the sides of the fronts of antenna planes of a transmission section and a reception section.
Figure 6B:
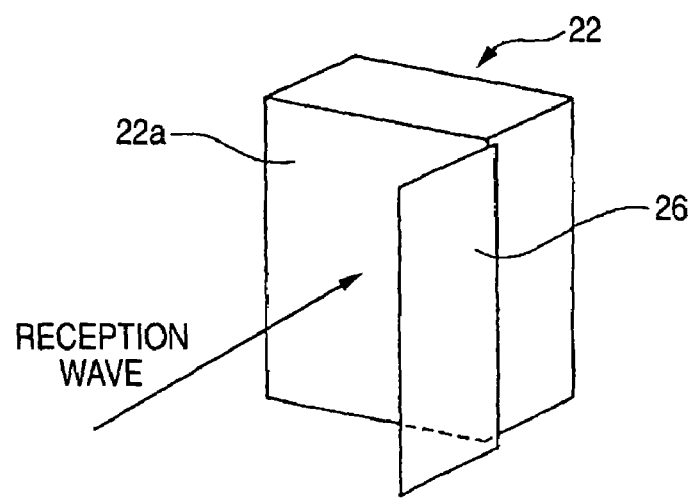
Figure 7:
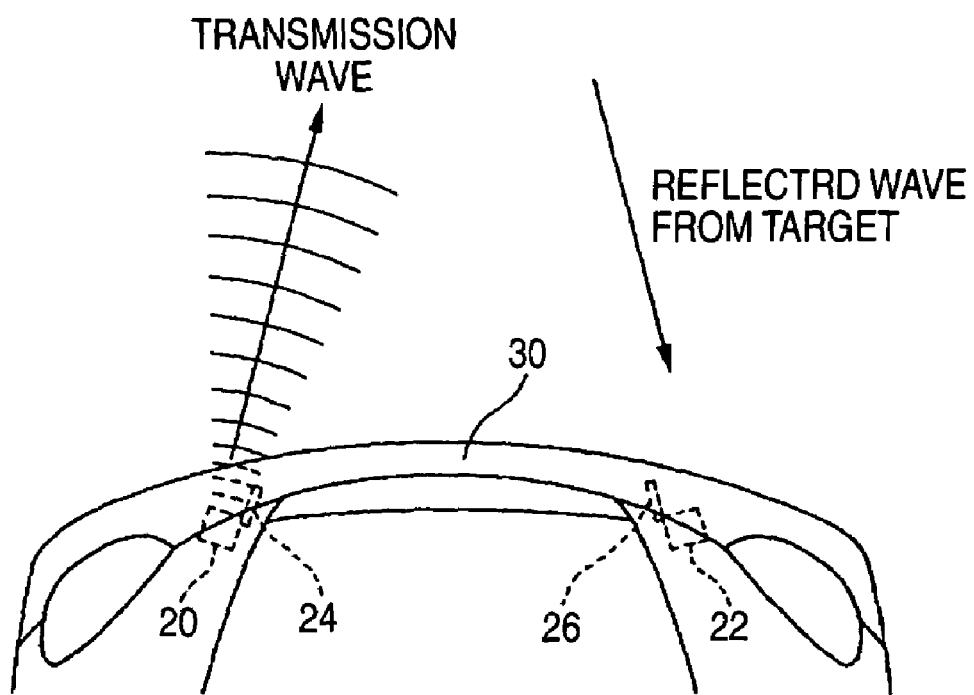
FIG. 7 is a drawing to show a transmission wave and a reception wave when shield members are provided.

As described above, there is a fear of determining that the dumper 30 is a target depending on the strength of the energy distribution in the closed space, or it is feared that the effect of masking the reflected wave from the target may occur. Then, in the embodiment, measures for suppressing the level of the energy distribution occurring in the bumper to be less than the reflection amount of the target are taken as follows:

The radar wave has the following feature. When the radar wave transmitted from the transmission section 20 passes through the permeable member 30, the radar wave entering the permeable member 30 perpendicularly has a high permeability, namely, is less reflected, and the radar wave entering the permeable member 30 at an angle has a lower permeability, namely, is largely reflected. Then, in the embodiment, a shield member 24 is disposed on the side in the front of an antenna plane 20a of the transmission section 20 as shown in FIG. 6A, whereby the angle at which the radar wave enters the bumper 30 is suppressed as shown in FIG. 7. Likewise, a shield member 26 is disposed on the side in the front of an antenna plane 22a of the reception section 22 as shown in FIG. 6B, whereby the reflected wave by the bumper 30 is prevented from being received. The shield members 24, 26 may be made of aluminum or wave absorber.

The shield member 24 (26) may be formed integrally with the same member as the case of the transmission section 20 (the reception section 22) or may be disposed on the bumper 30 side, namely, the permeable member side.

Figure 8:
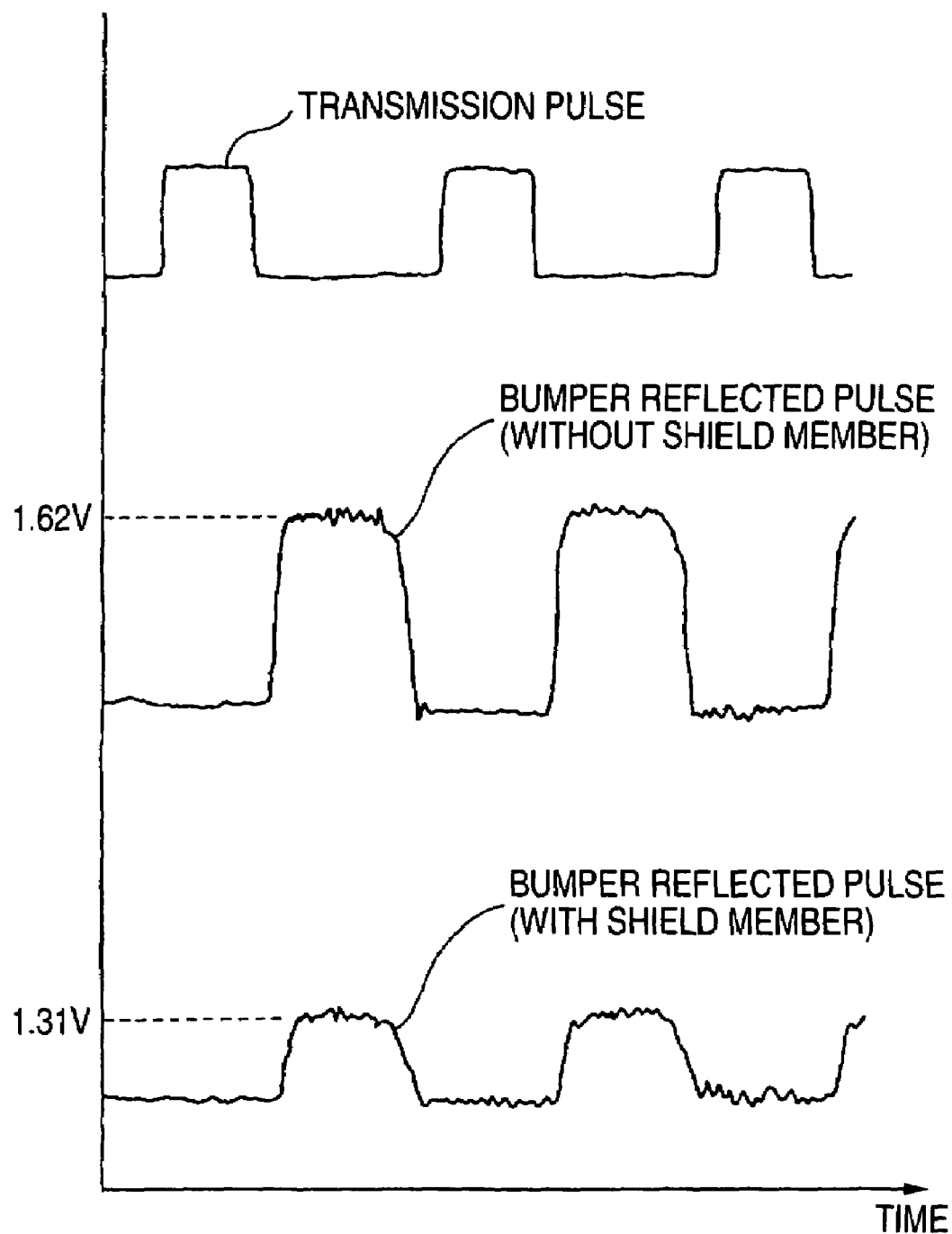
FIG. 8 is a waveform chart to show the measurement result of the reflected wave by the bumper when the shield members are inserted and that when the shield members are not inserted.

FIG. 8 is a waveform chart to show the measurement result of the reflected wave by the bumper 30 in a case where the shield members are inserted and in a case where the shield members are not inserted. When the shield members 24 and 26 are not inserted, the reflected wave by the bumper 30 shows 1.62V (−66.5 dB); when the shield members 24 and 26 are inserted, the reflected wave by the bumper 30 is improved to 1.31 V (−79.3 dB).

That is, insertion of the shield members 24 and 26 results in an improvement of about 13 dB. Assuming that the threshold voltage to recognize the wave as the reflected wave by a target is 1.5V. When the shield members are added, it becomes possible to provide a margin of about 0.2 V, and the normal detection result can be produced. The longer the distance to the target is, the lower the reflection level is. Therefore, decreasing the level of the reflected wave by the bumper means extending the distance at which a target can be detected, resulting in improvement in performance.

Figure 9:
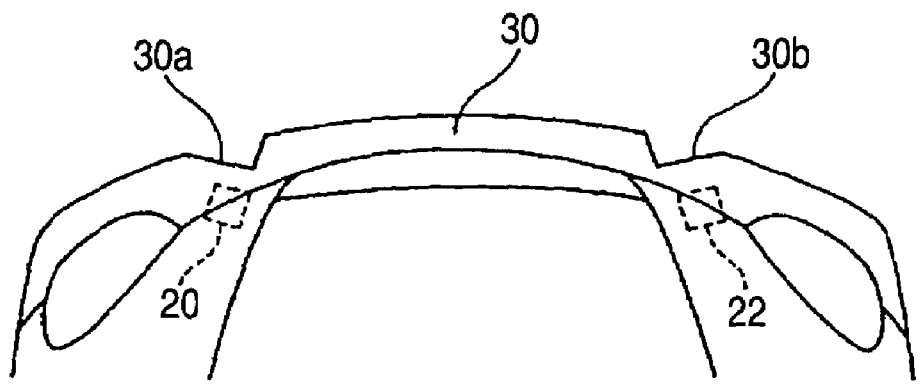
FIG. 9 is a plan view to show the layout of vehicle-installed radar sensor system according to a second embodiment of the invention.

FIG. 9 is a plan view to show the layout of vehicle-installed radar sensor system according to a second embodiment of the invention. In the first embodiment described above, the shield members are provided, thereby limiting the angle at which the radar wave enters the bumper, namely, the permeable member. In the second embodiment, the shape of a permeable member is changed, whereby the angle at which the radar wave enters the permeable member is limited and the distance between the permeable member and a transmission section/reception section is limited. Incidentally, when the permeable member and an antenna are nearer to each other, reflection tends to lessen.

Usually, the bumper is shaped like a fan and if the transmission section and the reception section are disposed in the bumper, it is considered that the shape increases reflection. Then, bumper 30 in the embodiment has indentations 30a and 30b at positions corresponding to a transmission section 20 and a reception section 22, so that the bumper 30 is worked so as to become almost perpendicular to the directivity of each antenna. Therefore, the effect of reflection by the bumper 30, namely, the permeable member is decreased. It becomes possible to decrease the effect of reflection, which is caused by approaching the indentations to the antennas.

Figure 10:
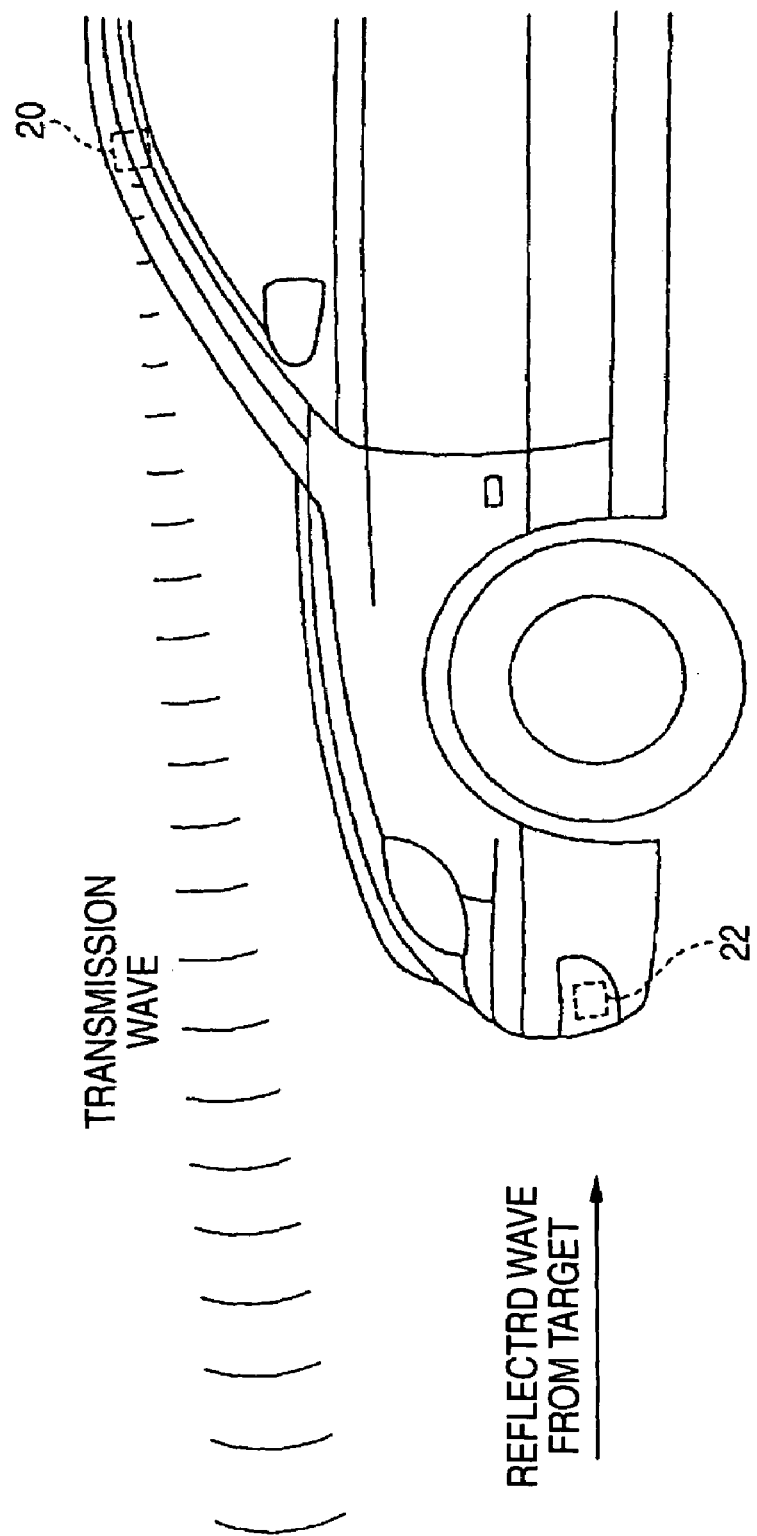
FIG. 10 is a side view to show the layout of vehicle-installed radar sensor system according to a third embodiment of the invention.

FIG. 10 is a side view to show the layout of vehicle-installed radar sensor system according to a third embodiment of the invention. In the first and second embodiments described above, reflection of a transmission wave by the bumper is decreased in the system having the transmission section and the reception section disposed in the closed space formed between the bumper and the vehicle body. However, it is also possible to adopt a structure free of the effect of reflection in such a manner that the transmission section and the reception section are not disposed in the common closed space.

In one of the structures, one of the transmission section and the reception section is disposed in the closed space formed between the permeable member and the vehicle body, and the other is disposed outside the closed space. In the third embodiment shown in FIG. 10, a reception section 22 is disposed in a bumper and a transmission section 20 is disposed in window glass, whereby the effect of a reflected wave by the permeable member (bumper) adversely affecting the target detection performance can be excluded.

Figure 11:
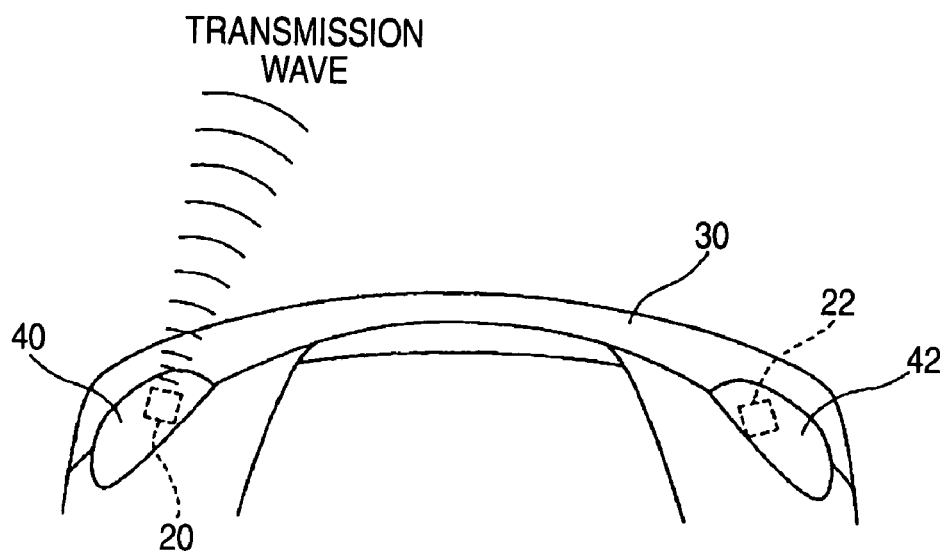
FIG. 11 is a plan view to show the layout of vehicle-installed radar sensor system according to a fourth embodiment of the invention.

FIG. 11 is a plan view to show the layout of vehicle-installed radar sensor system according to a fourth embodiment of the invention. In the third embodiment described above, one of the transmission section and the reception section is disposed in the bumper and the other is disposed outside. As another structure free of the effect of reflection, it is possible to dispose both the transmission section and the reception section outside the bumper. In this case, preferably the transmission section and the reception section are disposed in headlamp units from the viewpoint of the design.

Figure 12:
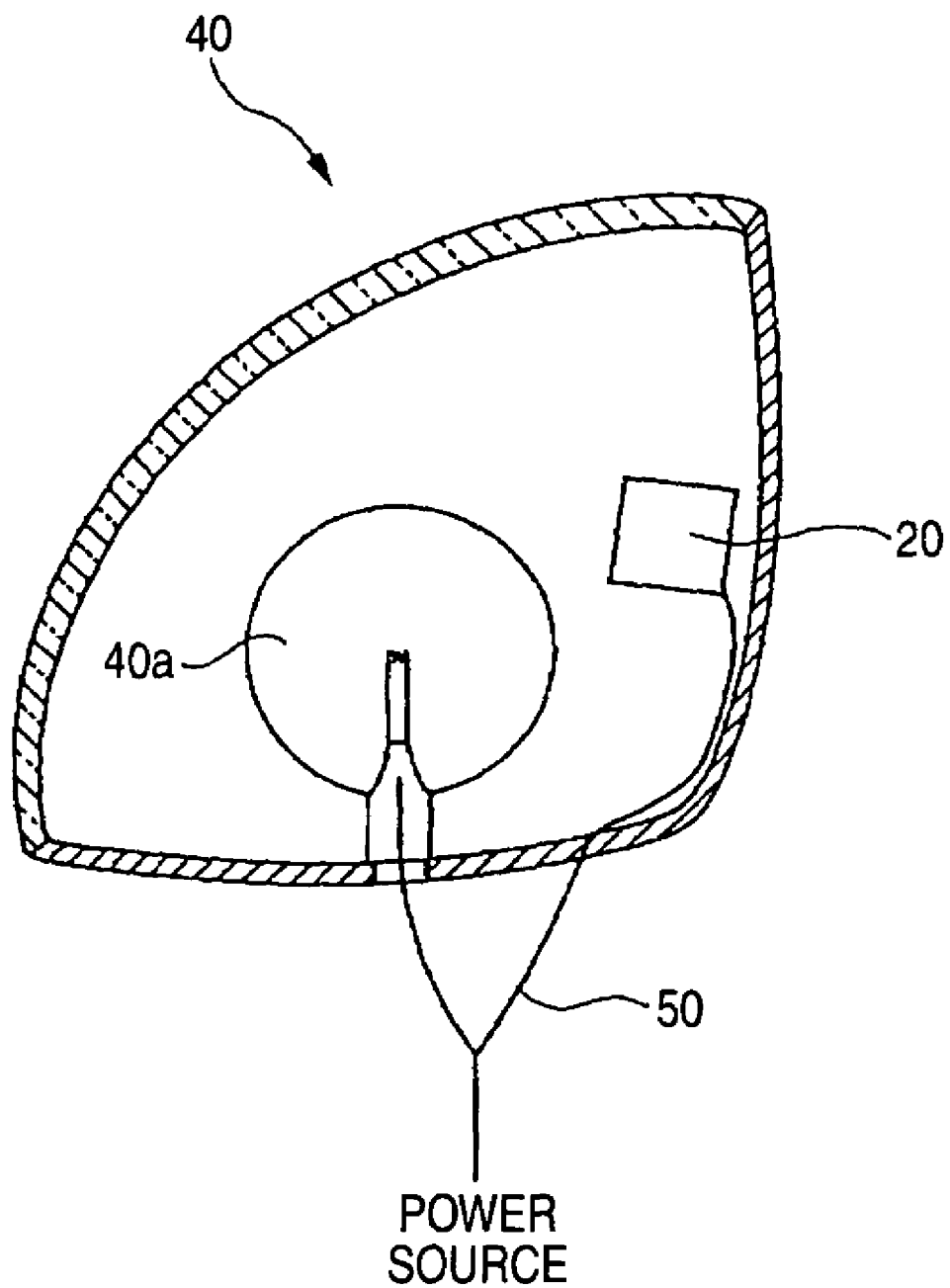
FIG. 12 is a drawing to show placement of parts in a headlamp according to the fourth embodiment of the invention.

In the fourth embodiment shown in FIG. 11, a transmission section 20 is disposed in a left headlamp unit 40 and a reception section 22 is disposed in a right headlamp unit 42. To integrate the transmission section or the reception section with the headlamp unit, the power supply line to the transmission section 20 and the power supply line to a lamp 40a can be made common as shown in FIG. 12, and the power supply line to the reception section 22 and the power supply line to a lamp can also be made common in a similar manner.

If the transmission section and the reception section are integrated with fog lamp units rather than integrated with the headlamp units, a similar advantage can be provided. In the embodiments, the pulse system is adopted as the radar system, but the invention is not limited to this; spread spectrum system of UWB (Ultra Wide Band) may be adopted.

As described above, according to embodiments of the invention, in the vehicle-installed radar sensor system, the effect of the reflected wave by the permeable member adversely affecting the target detection performance is lessened or excluded, and degradation of the target detection performance is avoided.

What is claimed is:

1. A vehicle-installed radar sensor system comprising:
   a transmission section which is disposed in a closed space formed between a permeable member provided in a vehicle and a vehicle body and transmits a radar wave to outside of the vehicle through the permeable member;
   a reception section which is disposed in the closed space at a distance from the transmission section and receives a reflected wave by a target through the permeable member; and
   a shield member which is disposed in at least one of the transmission section and the reception section, the shield member extending beyond a front edge of the at least one section with which it is disposed and extends away from the at least one section, the shield member suppressing reflecting by the permeable member of the radio wave transmitted by the transmission section when the shield member is disposed in the transmission section, the shield member suppressing reflecting by the permeable member of the reflected wave by the target when the shield member is disposed in the reception section.

2. The vehicle-installed radar sensor system according to claim 1, wherein the shield member is formed integrally with the same member as a casing of the at least one of the transmission section and the reception section.

3. The vehicle-installed radar sensor system according to claim 1, wherein the shield member is disposed on the permeable member side.

4. A vehicle-installed radar sensor system comprising:
   a bumper comprising a permeable member disposed on a front of a vehicle;
   a transmission section which is disposed in a first closed space formed between the permeable member and a vehicle body and transmits a radar wave ahead of the vehicle through the permeable member; and
   a reception section which is disposed in a second closed space at a distance from the transmission section and receives a reflected wave by a target through the permeable member, wherein:
   the permeable member of the bumper has a recess substantially perpendicular to an antenna directivity at positions corresponding to the transmission section and the reception section, and the second closed space is different than the first closed space.

5. A vehicle-installed radar sensor system comprising:

a transmission section which transmits a radar wave ahead of a vehicle; and a reception section which receives a reflected wave by a target, wherein the transmission section is disposed in a first enclosed space and the reception section is disposed in a second enclosed space different than the first enclosed space; and each of the transmission section and the reception section is integrated with one of a headlamp unit and a fog lamp unit of the vehicle.

6. The vehicle-installed radar sensor system according to claim 5, wherein:

one of the transmission section and the reception section is disposed in a closed space formed between a permeable member provided on a front of the vehicle and a vehicle body; and the other is disposed outside the closed space.

7. A vehicle-installed radar sensor comprising:

a transmission section which is disposed in a closed space formed between a permeable member provided in a vehicle and a vehicle body and transmits a radar wave to outside of the vehicle through the permeable member; and a shield member which is disposed in the transmission section, extends axially beyond a front edge of the transmission section away from the transmission section, and suppresses occurrence of a reflected wave by the permeable member.

8. A vehicle-installed radar sensor comprising:

a transmission section which is disposed in a closed space formed between a permeable member provided in a vehicle and a vehicle body;

a reception section which is disposed in the closed space at a distance from the transmission section and receives a reflected wave by a target through the permeable member; and a shield member which is disposed in the reception section, extends axially beyond a front edge of the reception section away from the reception section, and suppresses reception of a reflected wave by the permeable member.

* * * * *